Figure 1:
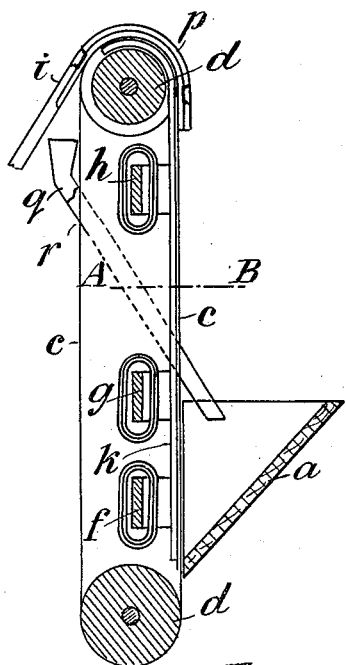

Aug. 19, 1930.  H. A. SKOV  1,773,646

MAGNETIC DEVICE FOR HANDLING METAL BOTTLE CAPS

Filed Jan. 4, 1927

INVENTOR
H. A. Skov
by Langner, Parry, Card & Langner
Att'ys.

Patented Aug. 19, 1930

1,773,646

UNITED STATES PATENT OFFICE

HENRY ARNOLD SKOV, OF COPENHAGEN, DENMARK, ASSIGNOR TO A/S DANSK PRESSE-FABRIK, OF COPENHAGEN, DENMARK

MAGNETIC DEVICE FOR HANDLING METAL BOTTLE CAPS

Application filed January 4, 1927, Serial No. 158,955, and in Denmark September 29, 1926.

This invention relates to a process and apparatus for automatic conveyance of crown cork caps or finished crown corks to machines used respectively for manufacturing crown corks and, for instance, for capping or stoppering by means of crown corks. The object of the invention is to meet the defects incident to the hitherto employed conveying or feeding apparatus which more especially consist in this that the caps or crown corks filled into the feed box, when being conveyed by the mechanical feeder to the conveying shoots or channels of the machine, easily become scratched and damaged on their outer surface which is covered by rustless metal and lacquer or paint. The mechanical feeder may also when operating amongst the caps or crown corks filled into the feed box cause deformation of a few caps which during their passage through the machine may produce jammings and disturbances of operations.

In order to meet the above mentioned defects I have in my process according to the invention discarded the mechanical feeding, instead of which magnetic feeding is employed, that is to say, the caps or crown corks which are made from sheet iron and normally are covered on their outer surface with rustless metal and lacquer are drawn out of the feed box by magnetic force, in such a manner that they can neither be scratched nor deformed when being drawn out. When drawn out of the feed box the caps or crown corks are similarly conveyed to the conveying shoots or channels of the machine by magnetic force, after which they will slide down into the shoot singly and turned the right way and also in close succession, when they have passed out of the field of action of the magnetic force.

The apparatus for carrying out the said process essentially comprises an endless, non-magnetic belt or tape, as for instance a thin brass belt, which passes through the feed box, connecting this feed box with the conveying shoot of the machine. Within that portion of the said belt adjacent to the feed box are mounted permanent magnets, electromagnets or electric coils which supply the magnetic force necessary for drawing out the caps or crown corks from the feed box and for their conveyance to the conveying shoot or channel of the machine.

In the following "magnet" or "magnets" is meant to include permanent magnets as well as electromagnets and wire coils. The magnets situated immediately behind the non-magnetic belt or tape are so distributed or are of such force that the magnetic force acting on the caps or crown corks decreases in a direction from the feed box to the conveying shoot, whereby it is obtained that superfluous caps drawn out of the feed box together with the cap normally drawn out gradually will become released and will again drop into the feed box, so that the caps will arrive singly and in succession one behind another to the conveying shoot.

Of the caps drawn out approximately 80% will have been turned the right way when placed on the non-magnetic belt or tape, owing to the fact that the magnetic force can exert a stronger influence on the projecting outer surface of the cap than on its hollow inner surface. As only the caps turned the right way may be introduced in the conveying shoot of the machine, however, a sorting device is adapted between the said shoot and the endless belt, permitting only the caps which are turned the right way to enter the shoot, while the caps turned the wrong way are returned to the feed box.

The magnetic field must be relatively narrow in the direction of movement of the caps, so that the caps are conveyed arranged practically speaking in a single row to the shoot of the machine; the entrance of the said shoot is provided with guiding organs which will serve to refuse admission of caps lying outside the said row and to return them to the feed box.

As the conveying shoot of the machine must always be filled with caps the endless belt or tape is moved at great velocity, so that the caps conveyed thereby are caused to exert a certain pressure to enter the said shoot. If this should produce an accumulation of caps at the entrance to the shoot, the superfluous caps will fall off the belt and back into the feed box.

The above described endless belt or tape may be replaced by a rotating table, in which case the magnets are placed underneath this table.

Figure 2:
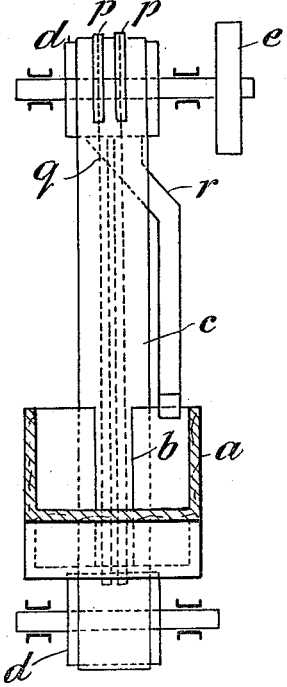
Figure 4:
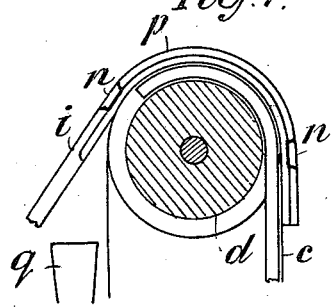
Figure 5:
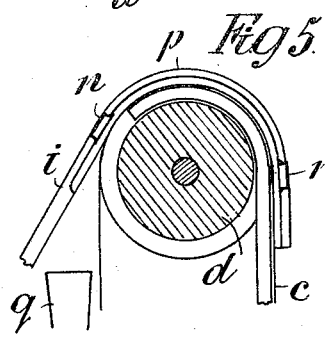
Figure 3:
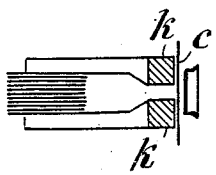

A constructional form of the apparatus for carrying out the process has been essentially schematically illustrated in the drawing, in which Figs. 1 and 2 show the apparatus in side and front elevation respectively, the feed box being shown in section, Fig. 3 a sectional view on line A—B in Fig. 2, on a larger scale, and Figs. 4 and 5, in larger scale, the sorting mechanism for returning to the feed box the caps which have not been turned the right way.

Referring now to the drawing the reference character $a$ in Figs. 1 and 2 indicates a feed box or container, open at the top, in which the caps or crown corks are filled; the caps or crown corks will slide down along the oblique front wall of the feed box towards the vertical back wall of the same, in which a vertical aperture $b$ is adapted with beveled edges. Through this aperture the caps or crown corks may come into contact with the endless belt or tape $c$ which is moved constantly in the direction of the arrows behind the feed box, the said belt or tape passing over two drums $d$ of which the upper is driven by means of a belt from the pulley $e$ or in another suitable manner. The belt or tape $c$ is made of non-magnetic material, such as thin brass-plate, and immediately behind its front portion are mounted magnets $f$, $g$, $h$, which may be either permanent magnets or electromagnets. The magnets may also be replaced by wire coils.

The magnets, whose number or distance from the belt may be varied as desired, are mounted in such a manner that the ensuing magnetic force has its greatest intesity opposite the feed box $a$ and decreases in a direction upwards towards the upper end of the belt from where the conveying shoot $i$ leads to the crown cork machine or the stoppering machine. For this reason the shown constructional form has its two magnets $g$ and $f$ mounted immediately behind the aperture $b$ in the wall of the feed box $a$, while the third magnet $h$ is mounted adjacent the upper end of the belt. In the shown constructional form the magnets are provided with two pole-pieces $k$ common to them all, and because of this arrangement the caps drawn out of the feed box $a$ by the magnets $g$ and $f$ and adhering direct to the belt may possibly fall off when they reach the regions in which the magnetic force acting on the belt decreases, in such a manner that the caps will adhere singly and practically speaking in succession to the belt at its upper end.

Of the caps drawn out of the feed box by the magnets some 80% will be turned the right way because the magnetic force is more capable of acting upon the convex outer surface of the caps $n$ than on their concave inner face. As, however, only caps turning the right way may be admitted to the shoot of the machine a guiding and sorting mechanism is arranged in front of the said shoot or its entrance, consisting of two shaped rails $p$ mounted at a distance from each other corresponding to that part of the cap which has been bent outwards. The front edge of the said mechanism serves partly to refuse or turn off any caps lying outside the row of caps and to push them off the belt so that they may drop back into the feed box, and partly serves to return caps turned wrong to the feed box, so that only caps turning the right way will enter the conveying shoot $i$ of the machine. This sorting out of caps turned right from caps turned wrong is illustrated in Figs. 4 and 5 of the drawing, and it will be seen that it is occasioned by that the collar of the cap in the first case will be situated above the rails $p$ (Fig. 4) so that the cap may slide freely into the conveying shoot $i$, while in the second case the collar of the cap will be situated under the rails $p$ (Fig. 5) and accordingly, when the cap $n$ reaches the conveying shoot $i$, will fall down into a funnel $q$, from which the caps will be led back to the feed box $a$ by means of a tube $r$. Where the term "disadvantageous position" is employed with reference to the position of the caps, it is meant that the caps may either be inserted with their concave surface outward from the belt, be superposed one upon the other, be displaced too far laterally with respect to the belt, or be fed too rapidly towards the discharge chute.

As explained above the conveying shoot $i$ must always be filled with caps, and for this reason the endless belt $c$ is moved at such a speed that the caps conveyed thereby always will exert pressure on each other to get into the conveying shoot. If this causes any accumulation of caps at the upper end of the belt the accumulated caps will be pushed off and drop into the feed box.

It will be evident that the constructional details above described and set forth may be varied without thereby departing from the principles of the invention. The apparatus may be made for one, two or a plurality of rows of caps, conveyed either on a single broad belt or tape or on a plurality of narrow ones.

I claim:

1. The method for automatically conveying crown cork caps or finished crown corks to machines for manufacturing the corks or to capping machines, comprising arranging a magnetic path for the conveyor, of progressively decreasing intensity, as it approaches the machine to which the caps or corks are delivered, to drop off substantially all of those caps which have adhered to the belt during the passage of the belt through the mass of corks, but which have not become properly oriented relative thereto, passing the conveyor through the mass of corks or caps, and passing the corks or caps adhering to the conveyor in promiscuous positions into the regions of decreasing magnetic force, thereby dropping by lack of magnetic force substantially all of the caps or corks adhering to the conveyor but which are improperly oriented relative thereto, and which may be in disadvantageous position with respect to the device employed to direct the crown caps to the machine to which they are to be delivered.

2. The method for automatically conveying crown cork caps or finished crown corks to machines for manufacturing the crown corks or to capping machines as claimed in claim 1, including the step of causing the minimum intensity of the magnetic path to be of such critical value that all caps or corks which are superposed drop off of the conveyor, whereas caps or corks positioned in one layer only are retained by the magnetic force.

3. The method for automatically conveying crown cork caps or finished crown corks to machines for manufacturing the crown corks or to capping machines as claimed in claim 1, including the step of causing the minimum intensity of the magnetic path to be of such critical value that all caps or corks facing the wrong way and all caps or corks which are superposed drop off, whereas caps or corks positioned in one layer only and having their convex metallic sides positioned toward the conveyor are retained by the magnetic force.

4. The method for automatically conveying crown cork caps or finished crown corks to machines for manufacturing the crown corks or to capping machines as claimed in claim 1 including the step of causing the magnetic path to be narrower than the diameter of a single cap and of such critical value that all of the caps drop off of the conveyor except those approximately in a line and having their convex metallic sides positioned toward the conveyor and being positioned in one layer only, whereas those caps or corks which are somewhat out of alinement are drawn into alinement by the magnetic attraction of said path.

5. Apparatus for conveying crown caps, comprising a conveyor belt of nonmagnetic material, magnetic devices arranged behind said belt so as to produce a magnetic force serving to make said caps or crown corks adhere to the conveyor belt, and a receptacle containing the caps or crown corks through which said belt moves in a portion of its magnetic path, thereby serving through the magnetic attraction of said path to convey the caps or crown corks to a receiving chute of a machine for manufacturing crown corks or to a capping machine, the said magnetic force being progressively diminished in the direction of the receiving chute, whereby those caps improperly oriented with respect thereto will be dropped from the conveyor.

6. Apparatus for conveying crown caps, comprising a conveyor belt of nonmagnetic material, magnetic devices arranged behind said belt so as to produce a magnetic force serving to make said caps or crown corks adhere to the conveyor belt, and a receptacle containing the caps or crown corks through which said belt moves in a portion of its magnetic path, thereby serving through the magnetic attraction of said path to convey the caps or crown corks to a receiving chute of a machine for manufacturing crown corks or to a capping machine, the said magnetic force being progressively diminished in the direction of the receiving chute, whereby those caps improperly oriented with respect thereto will be dropped from the conveyor, and means for driving said conveyor belt at such velocity that said chute will always be filled, while superfluous caps or crown corks on said belt are caused to fall off by impact with said last mentioned means, back into said container.

7. Apparatus for conveying crown caps, comprising a conveyor belt of nonmagnetic material, magnetic devices arranged behind said belt in such manner as to produce a magnetic force serving to make said caps adhere to said belts, the magnetic field having its greatest width substantially limited to the diameter of a cap, and a receptacle containing the caps, adjacent which said belt moves in a portion of said magnetic path, the intensity of the magnetic field being progressively diminished in a direction away from the receptacle, the narrowness of the magnetic fields and the progressively diminishing intensity cooperating to drop substantially all of those caps which adhere to the conveyor belt, but which are disadvantageously oriented with respect thereto, and to retain those caps properly oriented thereon.

In testimony whereof I affix my signature.

HENRY ARNOLD SKOV.